J. D. HOUCK.
COFFEE MAKING DEVICE.
APPLICATION FILED JUNE 27, 1921.

1,396,685.

Patented Nov. 8, 1921.
2 SHEETS—SHEET 1.

Inventor
John D. Houck,
By Franklin H. Hough
Attorney

J. D. HOUCK.
COFFEE MAKING DEVICE.
APPLICATION FILED JUNE 27, 1921.

1,396,685.

Patented Nov. 8, 1921.
2 SHEETS—SHEET 2.

Inventor
JOHN D. HOUCK,
By Franklin H Hough
Attorney

UNITED STATES PATENT OFFICE.

JOHN D. HOUCK, OF CHICAGO, ILLINOIS.

COFFEE-MAKING DEVICE.

1,396,685.  Specification of Letters Patent.  Patented Nov. 8, 1921.

Application filed June 27, 1921. Serial No. 480,738.

*To all whom it may concern:*

Be it known that I, JOHN D. HOUCK, a citizen of the United States, residing at Chicago, in the county of Cook and State of Illinois, have invented certain new and useful Improvements in Coffee-Making Devices, of which the following is a specification, reference being had therein to the accompanying drawings.

This invention relates to coffee making machines and has for an object to provide an attachment for a receptacle, such as a coffee pot, urn or the like, which shall contain the coffee in improved means while water is being poured therethrough to constitute of the coffee mass itself a filter for filtering the decoction.

A further object of the invention is to provide an attachment having a perforated bottom with means for supporting a fabric upon the bottom with a perforated top spaced above the fabric between which the ground coffee packs and swells to provide and produce a filter for removing all sediment from the decoction.

A further object of the invention is to provide a device of the class having improved features for convenience and rapidity of operation.

With these and other objects in view, the invention comprises certain novel parts, elements, units, combinations and arrangements as disclosed in the drawing together with mechanical equivalents thereof, as will be hereinafter more fully described and claimed.

In the drawing.

Like characters of reference indicate corresponding parts throughout the several views.

Figure 1:
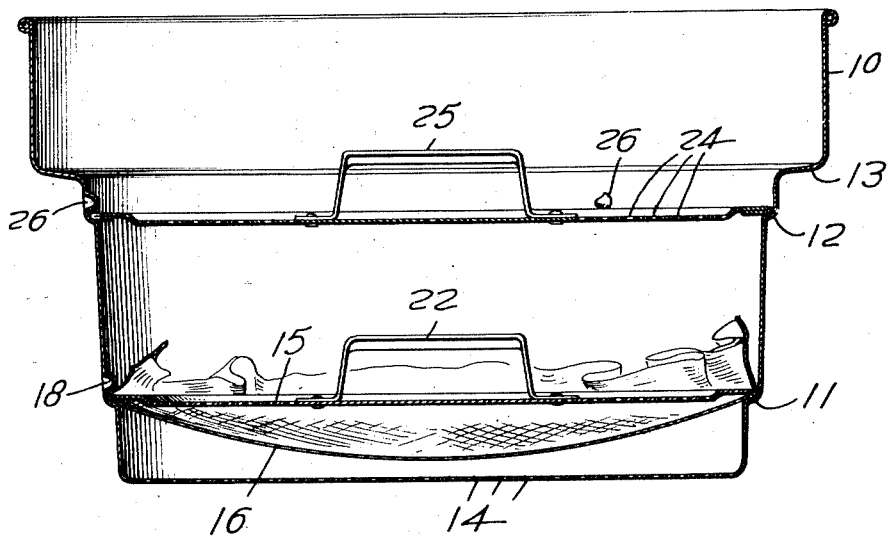
Figure 1 is a view of the device substantially in vertical diametrical section.
Figure 2:
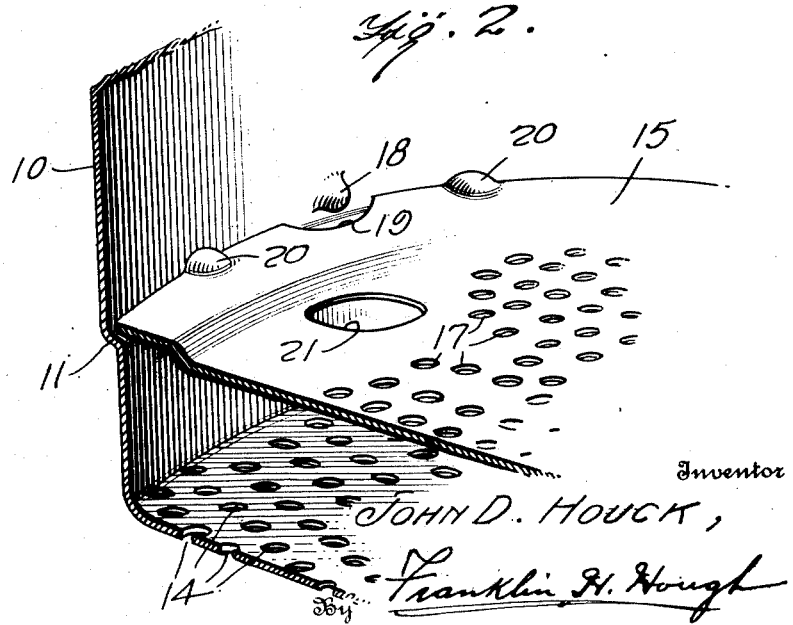
Fig. 2 is a fragmentary perspective view, one of the planes being taken substantially upon a diametrical section.
Figure 3:
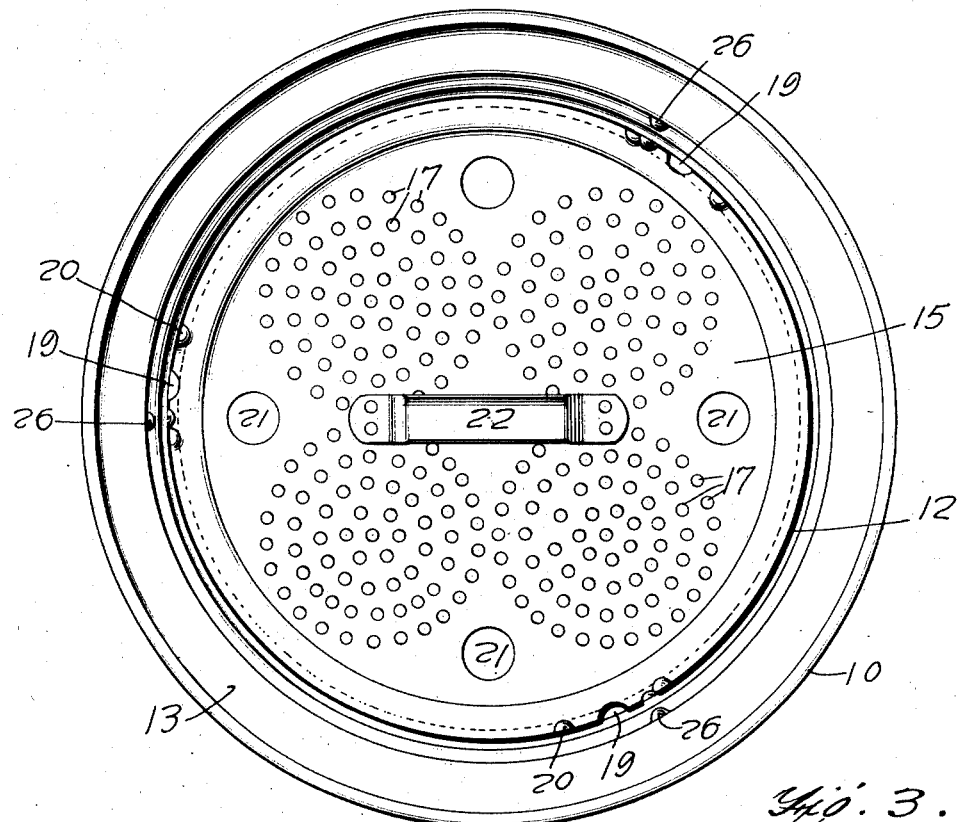
Fig. 3 is a top plan view of the device.

The improved coffee making attachment which forms the subject matter of this application comprises a container 10, of a size and general shape to correspond to the parts with which it is to be associated. The container is provided with annular shoulders 11, 12 and 13, any one of which may be employed to support the device upon the edge of the pot or receptacle with which it is to be employed, although preferably the shoulder 12 will be employed for that purpose and the device will preferably be of such dimensions as to fit the pot, container or urn at that point.

The bottom of the receptacle 10 is perforated, as indicated at 14, and upon the shoulder 11 a disk 15 is positioned. Between the perforated bottom 14 and the disk 15 a cloth or fabric 16 is employed, having its edges upturned and engaged between the periphery of the disk 15 and the shoulder 11. The cloth is preferably of such dimension that it may be depressed to substantially fill the chamber between the disk 15 and the perforated bottom 14. The disk 15 is provided with perforations 17 of such dimension that the ground coffee poured upon the disk 15 will pass through the perforations on to the fabric 16. The amount of ground coffee poured upon the disk 15 will depend upon the size of the container and the strength of the decoction to be brewed, but will be an amount, of course, considerably in excess of that required to fill the chamber between the disk 15 and the perforated bottom 14. As water is poured upon the coffee resting upon the disk 15, more of the ground coffee is sluiced through the perforation 17 until the chamber below the disk 15 has been substantially filled, the fabric 16 yielding at its marginal edges to such filling and to conform to the area of the chamber. The water thus poured through swells the ground coffee contained in the chamber, packing the coffee into a mass which forms an ideal filter for the filtration of further fluid passed through. It is well known that in the use of such devices, boiling water is poured through the coffee and after passing through is drawn off and poured through again, sometimes an operation calling for the pouring of liquid through several times. This gives the coffee a chance to swell, as stated, to form the filter for the decoction poured through the second and subsequent times.

It is evident that the swelling of the coffee below the disk 15 would have a tendency to raise the disk to prevent which lugs 18 are provided, preferably, though not necessarily, by striking up a part of the wall of the container as indicated at Figs.

1 and 2. A number of such lugs are inserted within the container spaced above the shoulder 11. The disk 15 is provided with a cut-out portion 19 proportioned to pass over the lugs 18 and stops 20 are struck up from the disk to prevent the rotation of the disk more than a short distance in either direction after passing over the lugs 18. These stops are merely a precautionary measure to assist in the ready disassembling of the parts.

The disk is also provided with larger perforations 21 which perform no particular function except that they enable the operator to insert fingers through the disk to manipulate the same either for insertion or withdrawal as an auxiliary to or substitution for the handle 22.

While not necessary to the proper positioning of the coffee, preferably a second disk 23 is employed, substantially identical with the disk 15 except in matter of size, being of sufficient diameter to engage upon the shoulder 12 and provided with perforations 24 and handle 25. This disk when in position upon the shoulder 12, locked under the lugs 26, serves to disseminate the water, the decoction being poured through so that it will pass through the coffee in a well distributed condition. In other words, the disk 23 is simply a distributer when in its operative position.

Figure 4:
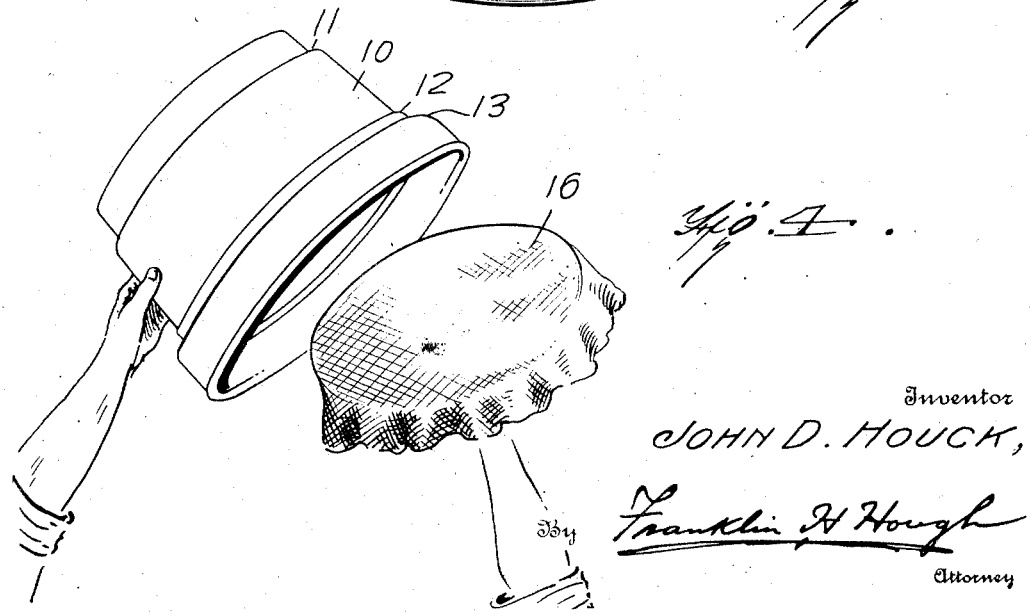
Fig. 4 is a diagrammatic view showing the improved manner of putting the parts together.

It is, of course, well known that such devices embodying a fabric upon which the coffee is supported are well known and that devices for maintaining such fabric in proper position upon an annular shoulder are old in the art. The present invention, however, provides, as will be noted, a chamber of which the fabric is the bottom and sides with a perforated top into which coffee masses and swells to produce thereby a filter for removing from the coffee a greater percentage of the sediment and other extraneous matter than can be done when the coffee is allowed to rest only loosely and unconfined upon the supporting fabric. To disassemble after use, the disk 23 is removed by grasping the handle 25 and rotating until the lugs 26 are cleared, whereupon the device is inverted and the ground coffee resting upon the top of the disk 15 dumped. The disk 15 is now removed by rotating until the lugs 18 are cleared, whereupon it may also be removed and by again inverting the container the remaining coffee contained in the fabric also dumped. The parts may now be washed in the usual manner and the fabric returned to operative position by being spread over the inverted disk 15 in the position shown in Fig. 4 and the container in inverted position moved downwardly over such fabric and supporting device. It will be noted that the periphery of the disk 15 does not lock beneath the lugs 18 in such manner as to clamp or pinch the edges of the fabric, leaving such fabric free to be drawn into the chamber as the filling of the chamber with coffee and the swelling of the contained coffee makes necessary.

What I claim is:

1. A coffee making device comprising a receptacle having a perforated bottom, means to maintain a perforated disk in spaced position above the perforated bottom, and means to support a fabric from the periphery of the perforated disk.

2. A coffee making device comprising a receptacle having a perforated bottom, a perforated disk corresponding in diameter to the container, means to maintain the disk at predetermined spaced position above the perforated bottom, and a fabric carried by the disk, properly proportioned to correspond substantially to the walls of the chamber below the disk with its margins supported by the periphery of the disk.

3. A coffee making device comprising a receptacle having a perforated bottom and an annular shoulder above the bottom, of a disk properly proportioned to bear upon the annular shoulder, means to prevent the disk from raising off from said shoulder, and a fabric about the periphery of said disk proportioned to correspond substantially to the walls of the chamber below the disk.

In testimony whereof I hereunto affix my signature.

JOHN D. HOUCK.